United States Patent Office 3,144,553
Patented Aug. 11, 1964

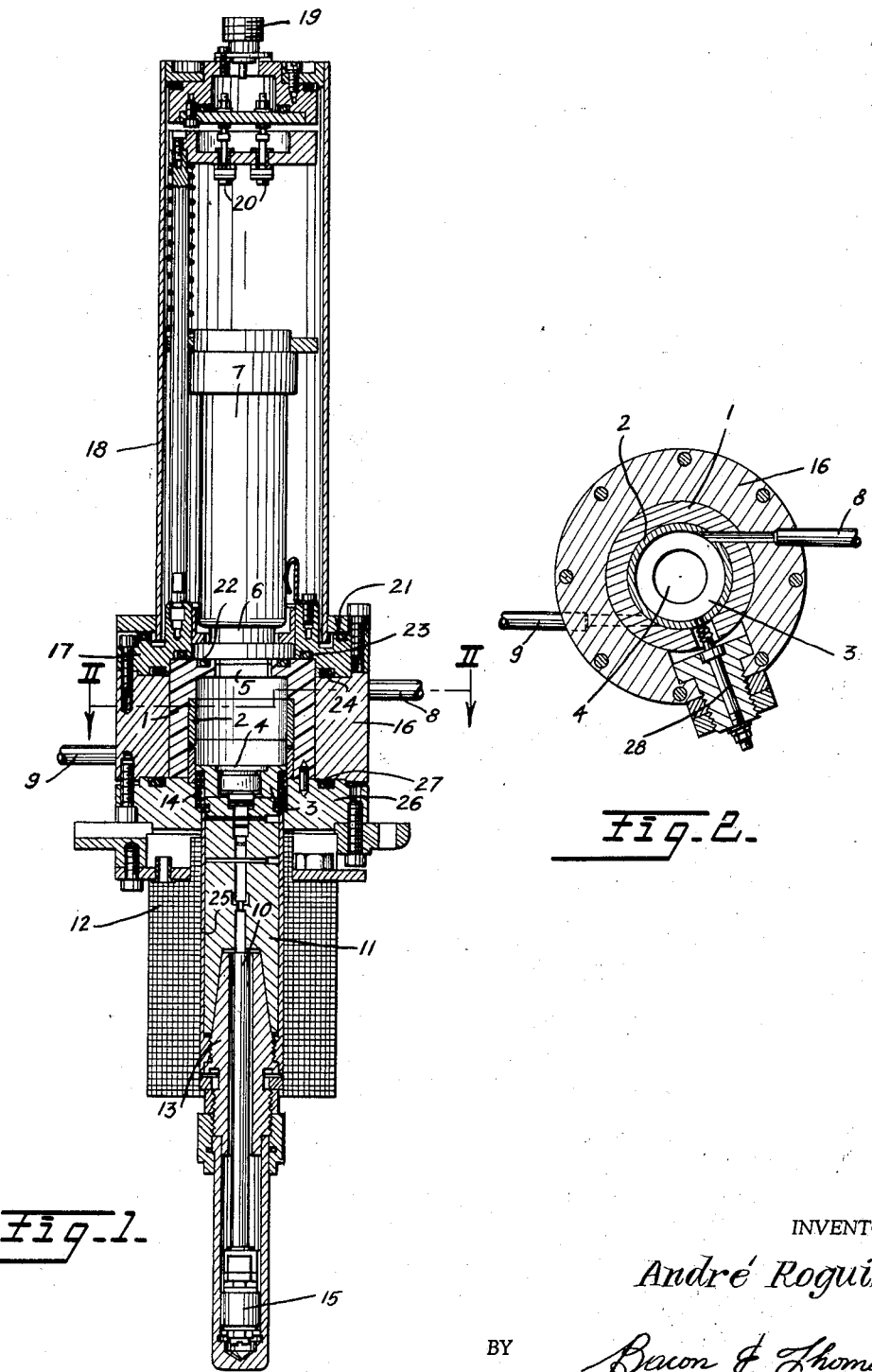

3,144,553
SCINTILLATION DETECTOR FOR DETECTING RADIOACTIVE PARTICLES IN A GASEOUS STREAM
André Roguin, 17 Ave. St. Exupery, Antony, France
Filed May 19, 1961, Ser. No. 111,256
Claims priority, application France June 2, 1960
4 Claims. (Cl. 250—71.5)

The present invention relates to a measuring device intended to evaluate the concentration of certain fission products contained in a gaseous current. This gaseous current can be that used to cool a nuclear reactor; in a liquid-cooled reactor, it can be the gaseous current arising from the degassing of the coolant. Generally speaking, the device according to the invention is adapted to supervise the behaviour of the sheaths enclosing the rods of fissile material contained in an "experimental loop."

It is known that devices for detecting breaks in the sheaths of reactors which are cooled in the gaseous phase are normally based on the measurements effected on the radioactive products contained in a sample of the cooling fluid taken directly from the outlet of the tubes containing the sheathed rods of nuclear fuel.

The difficulties encountered in the manufacture of devices of this kind are known. It is known that these difficulties are due among other things to the fact that the activity of the fluid taken off can be considered as coming from fission products which have recently been shed into the coolant, the long-life fission products previously accumulated, and, finally, portions of the coolant itself, which have become activated. In fact the contribution of the fission products which have recently been shed is generally small in relation to the long-life products, which itself is small in relation to the contribution due to the portions of the coolant. These relative proportions explain the obstacles to be surmounted in order to manufacture a device which allows the presence of tiny cracks on a sheath which has been immersed in already very active fluid to be detected.

In different known examples of such devices, the cooling gas or the portion of the latter used for detection, after the formation of radioactive ions due to the presence of the fission products carried along by the gas, passes between a fixed repulsion electrode and a movable electrode which collects the radioactive ions during a predetermined time and then, by its movement, takes them to the immediate vicinity of an actual detector member which is used for the measurement.

In these devices the measurement almost exclusively relates to the rubidium, caesium, barium and strontium ions which alone remain absorbed. Their concentration upon the collector member increases and, if the collection time of the ions were unlimited, apprachs a proportion such that the collection compensates for the disintegration of the absorbed atoms. The concentration reached at the end of a predetermined time is proportional to the release of the fission products. The corresponding activity is measured for example, by means of a scintillation counter.

In one particular device the movable electrode is constituted by the surface of a drum. Since this drum has to be rotated, it is necessary to provide sufficient play between the surface of the drum and the surface of the scintillator used for measurement. The presence of this play which is filled with active gas introduces a disturbing noise level during meausrement.

It is a primary object of the present invention to render such measurement devices suitable for supervising a nuclear reactor so that, during the measurement on the movable electrode, the noise level corresponding to the presence of active gas between the electrode and the scintillator is eliminated, and, moreover, to simplify the control mechanism for moving the movable electrode.

To this end the present invention provides a device for measuring the concentration of gaseous-phase fission products particularly for the supervision of the sheaths of members of fissile material of the kind in which the gas, which contains radioactive ions, due to the presence of the products of fission is abstracted and passed between a fixed repulsion electrode and a movable electrode which collects the radioactive ions during a predetermined time, and then takes them by this movement close to the actual detector member, said device comprising a movable electrode arranged on the central portion of a piston arranged to move in an insulating cylinder around which is provided a fixed annular repulsion electrode, a measurement scintillator arranged in the upper portion of the insulating cylinder, inlet and outlet channels for establishing, within the cylinder, when the piston is completely separated from the scintillator, a current of gas taken off with an output such that the time that the gas remains in the said cavity is suitable for the formation of radioactive ions, means for the establishment of a difference in potential of suitable value between the said electrodes in order to bring about, on the movable electrode, the collection of the ions formed, and means for applying the movable electrode on to the surface of the scintillator during the measurement period.

The invention also has a number of other features which will be described later.

In order that the invention may be more clearly understood, reference will now be made to the accompanying drawings which show one embodiment thereof by way of example, and in which:

FIGURE 1 shows a vertical section through a device according to the invention, and FIGURE 2 shows a cross-section thereof along the line II—II of FIGURE 1.

Referring to the drawings, like reference numerals refer to like parts.

FIGURE 1 shows a vertical section through a detector assembly according to the invention and in which I indicates a cylinder of insulating material containing an electrically insulated hollow electrode 2 closely adjacent the inner wall thereof. A piston 3 of insulating material, the central portion of which carries an electrode 4, is displaceable within the cylinder 1.

When the piston is in its uppermost position, it abuts the metalled surface of a scintillator 5. A light-conduit 6 is arranged as an intermediate member between the scintillator and a photo-multiplier 7. The diameter of the scintillator is chosen to be slightly smaller than the internal diameter of the cylinder, and approximately equal to that of the electrode 4, so as to reduce the noise level.

In its lowermost position, the piston 3 leaves the internal space of the cylinder 1 unoccupied. A current of abstracted gas can be passed through the space by means of an inlet pipe 8 and an outlet pipe 9. Furthermore, by applying a suitable difference in potential between the fixed electrode 2 and the movable electrode 4, an electrostatic field can be established in the internal space of the cylinder 1. In the embodiment illustrated, the electrostatic field is radially distributed about the axis of revolution of the cylinder 1. On the other hand, the movable electrode 4 and the metalled surface of the scintillator create nearly equivalent distributions of field in the immediate neighbourhood of their surfaces.

The piston 3, which is integral with a rod 10, is driven by a core 11 of ferro-magnetic material. When a coil 12 surrounding the core 11 is excited, the core is pulled on to the fixed armature 13; in this position the spring 14, arranged to take the piston towards its uppermost position, is compressed. When the current in the coil 12 is interrupted, the spring expands, the core 11 leaves the fixed armature 13 and the movable electrode abuts the scintillator. A damping device, constituted by a dash-pot 15 arranged at the end of the rod 10, allows any shocks at the end of the travel of the piston to be avoided.

The cylinder 1 is surrounded by a metal cylinder 16, which is slightly shorter than the cylinder 1. Cylinder rings are secured on either side of cylinder 16 by means of which rings the whole photo-multiplier unit is held at the upper portion, and piston-movement control unit is held at the lower portion. Thus the ring 17 fixed to the cylinder 16 supports the photo-multiplier protection tube 18. At the upper portion of this tube are provided electrical connector members to take off the useful signal from the photo-multiplier and, on the other hand, connector members 20 for supplying the photo-multiplier. A toric joint 21 is a light-proof joint intended to prevent the photo-multiplier from being subjected to parasitic influences. On the other hand toric joints 22, 23 and 24 which are respectively arranged between the cylinder 1 and the light-conduit 6, the cylinder 1 and the ring 17, and the ring 17 and the cylinder 16, are hermetic joints intended to prevent any escape of active gas. At the lower portion the fixed armature 13 is held by a tube 25 terminating in a ring 26 secured to the cylinder 16. A toric joint 27 ensures the hermeticity of this latter connection.

In FIGURE 2, the section at the level of the supply pipe shown allows the relative arrangement of the different elements already mentioned in connection with FIGURE 1 to be fixed. A connection 28 allows a difference of potential to be applied between the fixed insulating electrode and the rest of the apparatus, which is connected to earth, when the piston is in its lowermost position. The operation of the device illustrated will now be described.

In a first stage the piston 3 is in its lowermost position, the coil 12 is excited and there is a free space above the piston. A current of abstracted gas is established therein by means of the inlet and outlet pipes 8 and 9. The output of this gas is selected so that the period of time that the fission gases remain in the said space is such that there is a formation of radioactive ions. Since the fixed electrode has been taken to a positive potential, the electrostatic field prevailing inside the space brings about the absorption of the active ions on the movable electrode and on the scintillator. When the collection is finished the supply to the coil 12 is cut off and the spring 14 applies the movable electrode on to the scintillator whilst the movable electrode is connected to earth. The second operational stage begins and the pulses coming from the scintillator during this second stage are then utilised. The resulting count is a function of the quantity of active ions collected by the movable electrode and by the scintillator. It will be noted that during the second stage, that of the actual measurement, the quantity of active gas entrapped between the scintillator and the movable electrode is very small so that the parasitic influence of this gas may be discounted.

When the measurement stage is finished, the coil 12 is once more energised, and the core 11 is drawn into its lowermost position. The device is ready for a new cycle.

It should be noted that since the device according to the invention is used as a permanent installation, the concentration of the long-life active ions tends to increase on the surface of the movable electrode and on the surface of the scintillator. When using the measurements obtained by means of this device, it is therefore as well to eliminate by subtraction the influence of these products between two successive measurements. For example, one can subtract, from the count which has just been made after the application of the movable electrode on to the scintillator, the count which has been committed to memory and effected just before the movable electrode was separated from the scintillator during the immediately preceding measurement.

In order to do this, it may be advantageous to use an electronic memory system. In the device illustrated, the movement of the piston could serve to control a memorising relay. In any case it seems necessary to carry out at least two counts during the measurement period, these counts being separated by a sufficient interval of time to have an appreciable diminution of the short-life ions which have just been collected. In the embodiment described it has been found advantageous to select a collection period approximately equal to one-third of the total duration of a complete measurement cycle.

I claim:

1. Apparatus for detecting the presence of radioactive particles in a gaseous stream, comprising: side wall means defining a precipitation chamber, said side wall means being provided with inlet and outlet means for accommodating a flow of gas through said chamber; a wall enclosing one end of said chamber and having a scintillator mounted therein for use in measuring radiation within said chamber; a piston disposed in the other end of said chamber to close off the same; a fixed repulsion electrode mounted in said side wall means; a moveable electrode mounted on said piston in alignment with said scintillator for attracting ions disposed within said chamber; and means for moving said piston into said chamber until said moveable electrode is positioned in intimate contact with said scintillator, thereby cutting off said gaseous stream and exhausting said chamber.

2. The apparatus of claim 1 wherein said last-mentioned means comprises a solenoid-operated plunger operatively connected to said piston.

3. The apparatus of claim 1 wherein said fixed electrode comprises a ring element recessed in said side wall means in surrounding relation with respect to said chamber.

4. The apparatus of claim 1 wherein the surface of said scintillator is coated with metal to serve as a collector surface when current is applied to said fixed electrode.

References Cited in the file of this patent
UNITED STATES PATENTS
3,029,344    Long et al. _____ Apr. 10, 1962
FOREIGN PATENTS
818,685    Great Britain _____ Aug. 19, 1959